(12) United States Patent
Schneider et al.

(10) Patent No.: US 12,257,744 B2
(45) Date of Patent: Mar. 25, 2025

(54) TOOL APPARATUS FOR PRODUCING A COMPOSITE MATERIAL COMPONENT PART AND METHOD FOR PRODUCING A COMPONENT PART FROM A COMPOSITE MATERIAL

(71) Applicant: Deutsches Zentrum fuer Luft-und Raumfahrt e.V., Cologne (DE)

(72) Inventors: Marvin Schneider, Herrenberg (DE); Markus Kaden, Stuttgart (DE)

(73) Assignee: Deutsches Zentrum fuer Luft- und Raumfahrt e.V., Cologne (DE)

( * ) Notice: Subject to any disclaimer, the term of this patent is extended or adjusted under 35 U.S.C. 154(b) by 594 days.

(21) Appl. No.: 17/447,216

(22) Filed: Sep. 9, 2021

(65) Prior Publication Data
US 2022/0072807 A1    Mar. 10, 2022

Related U.S. Application Data

(63) Continuation of application No. PCT/EP2020/056470, filed on Mar. 11, 2020.

(30) Foreign Application Priority Data

Mar. 11, 2019  (DE) ..................... 10 2019 106 107.5

(51) Int. Cl.
*B29C 33/06*          (2006.01)
*B29C 35/08*          (2006.01)
(Continued)

(52) U.S. Cl.
CPC ............... *B29C 33/06* (2013.01); *H05B 3/34* (2013.01); *H05B 6/105* (2013.01); *H05B 6/14* (2013.01);
(Continued)

(58) Field of Classification Search
CPC . B29C 2035/0811; B29C 33/06; B29C 65/36; B29C 65/3604; B29C 65/3668;
(Continued)

(56) References Cited

U.S. PATENT DOCUMENTS 5,591,369 A * 1/1997 Matsen .................. B29C 33/60
                                                  219/603
5,683,608 A    11/1997 Matsen et al.
(Continued)

FOREIGN PATENT DOCUMENTS

DE          3205048        8/1983
DE          19615647      10/1997
(Continued)

*Primary Examiner* — Stella K Yi
(74) *Attorney, Agent, or Firm* — Lipsitz & McAllister, LLC (57) ABSTRACT

The invention relates to a tool apparatus for producing a composite material component part, comprising a forming tool having a contact region for a workpiece, wherein the forming tool is made, in at least a portion thereof, of an electrically conductive material; and an induction heating apparatus having an inductive heating mat, wherein the heating mat is positioned in spaced relation to the forming tool, and wherein a positioning of the workpiece is provided between the heating mat and the forming tool, in contact with the forming tool, and wherein heating of the forming tool is provided, in at least a portion thereof, by the induction heating apparatus. The invention further relates to a method for producing a component part from a composite material by way of a forming tool.

21 Claims, 6 Drawing Sheets

(51) Int. Cl.
| | |
|---|---|
| *B29C 70/30* | (2006.01) |
| *B29C 70/54* | (2006.01) |
| *H05B 3/34* | (2006.01) |
| *H05B 6/10* | (2006.01) |
| *H05B 6/14* | (2006.01) |
| *H05B 6/36* | (2006.01) |
| *H05B 6/44* | (2006.01) |

(52) U.S. Cl.
CPC ................. *H05B 6/36* (2013.01); *H05B 6/44* (2013.01); *B29C 2035/0816* (2013.01); *B29C 70/30* (2013.01); *B29C 70/54* (2013.01); *H05B 6/362* (2013.01)

(58) Field of Classification Search
CPC ................ B29C 65/3672; B29C 65/46; B29C 66/91651; H05B 2206/02; H05B 2206/022; H05B 6/02; H05B 6/065; H05B 6/10; H05B 6/6488

See application file for complete search history.

(56) References Cited

U.S. PATENT DOCUMENTS

| | | | |
|---|---|---|---|
| 2004/0244865 A1 | 12/2004 | Jung et al. | |
| 2005/0035115 A1* | 2/2005 | Anderson | H05B 6/105 219/759 |
| 2012/0018089 A1* | 1/2012 | Gueret | B29C 35/0805 156/499 |
| 2019/0274193 A1 | 9/2019 | Kaden et al. | |

FOREIGN PATENT DOCUMENTS

| | | | |
|---|---|---|---|
| DE | 10155935 | | 5/2003 |
| DE | 102008036101 | | 2/2010 |
| DE | 102008037224 | | 2/2010 |
| DE | 102011076463 | | 11/2012 |
| DE | 102011106648 | | 1/2013 |
| DE | 202015100080 | * | 3/2015 |
| DE | 102013111266 | | 4/2015 |
| DE | 102013223284 | | 6/2015 |
| DE | 102015114880 | | 3/2017 |
| DE | 102016209487 | | 11/2017 |
| DE | 102019109136 | | 10/2019 |
| EP | 0271250 | | 6/1988 |
| EP | 2508329 | | 10/2012 |

* cited by examiner

TOOL APPARATUS FOR PRODUCING A COMPOSITE MATERIAL COMPONENT PART AND METHOD FOR PRODUCING A COMPONENT PART FROM A COMPOSITE MATERIAL

This application is a continuation of international application number PCT/EP2020/056470 filed on Mar. 11, 2020 and claims the benefit of German application No. 10 2019 106 107.5 filed on Mar. 11, 2019, which are incorporated herein by reference in their entirety and for all purposes.

BACKGROUND OF THE INVENTION

The invention relates to a tool apparatus for producing a composite material component part, comprising a forming tool having a contact region for a workpiece, wherein the forming tool is made, in at least a portion thereof, of an electrically conductive material.

The invention further relates to a method for producing a component part from a composite material by way of a forming tool, in which method a workpiece is placed in contact against a contact region of the forming tool.

DE 10 2013 111 266 A1 describes a coil apparatus, comprising at least one current-carrying high-frequency Litz wire and a carrier for the at least one high-frequency Litz wire, wherein the at least one carrier is a mesh network and the at least one high-frequency Litz wire is held via one or more holding threads, said threads being in contact against the at least one high-frequency Litz wire at strands of the mesh network.

DE 10 2008 037 224 A1 discloses a relaxation mat for transmitting vibrations generated by magnetic fields to organisms, the relaxation mat comprising at least one flat coil over which are arranged next to one another and distributed over an area of permanent magnets, intersecting the magnetic field of the flat coil.

DE 101 55 935 A1 discloses a smart label which comprises a textile backing and a flexible wire-like and/or thread-like electrical conductor, wherein the conductor is arranged on or in the textile backing.

DE 10 2011 106 648 A1 discloses a portable data carrier comprising an antenna, wherein the antenna is produced by connecting warp and weft threads of an electrically conductive fabric.

DE 10 2008 036 101 A1 discloses an industrially manufactured textile material, comprising at least one electrically conductive structure in the form of a pattern.

DE 32 05 048 A1 discloses a magnet coil which is composed of flat and flexible conductor Litz wires.

DE 196 15 647 C2 discloses a coil mat for generating a magnetic field spread over an area.

DE 10 2011 076 463 A1 discloses a repair method for a shaped part made of a plastics material, in which method a repair element formed from the plastics material is applied to a damaged region of the shaped part and is joined thereto with a substance-to-substance bond under the action of heat. The heat is created by way of a passive heating element made of an electrically conductive material by applying a magnetic alternating field to the heating element.

An induction heating coil is known from EP 0 271 250.

DE 10 2013 223 284 A1 discloses an apparatus for fabricating a fibre-reinforced plastic component part, the apparatus comprising a shape forming tool, in which a board-like and, in particular, textile fibre preform can be hot-formed, in which electrically conductive reinforcing fibres are embedded in a heat-activatable binder, and comprising an induction heating device which comprises at least one inductor for creating a magnetic alternating field which induces electric currents in the electrically conductive reinforcing fibres of the fibre preform. The inductor is at least one sheet-like insert part separate from the shape forming tool, which insert part can be placed into the shape forming tool together with the fibre preform.

EP 2 508 329 A1 discloses a composite material consolidation apparatus for inductively heating and consolidating a composite material.

DE 10 2015 114 880 A1 discloses an inductively heatable forming tool, comprising an inductor receptacle and a susceptor serving as a receiver of the electromagnetic alternating field generated by an inductor, wherein the inductor receptacle allows the inductor to be laid out in different patterns.

DE 10 2019 109 136 A1 discloses an apparatus for producing near-net-shape, three-dimensional preforms, comprising a three-dimensional base body for a depositing operation of at least one provided pretreated tape or of at least one provided article comprising at least one pretreated tape, wherein the tape comprises at least one matrix system and at least one fibre.

DE 20 2015 100 080 U1 discloses an induction heating device, comprising a carrier and a coil device arranged on the carrier.

U.S. Pat. No. 5,683,608 A discloses a press forming element for use in an induction heating apparatus.

SUMMARY OF THE INVENTION

In accordance with an exemplary embodiment of the invention, there is provided a tool apparatus which offers a simple way of producing composite material component parts.

In accordance with an exemplary embodiment of the invention, the tool apparatus for producing a composite material component part comprises:
- a forming tool having a contact region for a workpiece, wherein the forming tool is made, in at least a portion thereof, of an electrically conductive material; and
- an induction heating apparatus having an inductive heating mat, wherein the heating mat is positioned in spaced relation to the forming tool, and wherein a positioning of the workpiece is provided between the heating mat and the forming tool, in contact with the forming tool, and wherein heating of the forming tool is provided, in at least a portion thereof, by the induction heating apparatus.

In at least the portion of the forming tool that is made of the electrically conductive material, inductive heating can be effected by way of the inductive heating mat via the induction of eddy currents and the corresponding eddy current losses. Contactless heating of the forming tool can thereby be effected via the induction heating apparatus.

The forming tool need not be particularly configured for that purpose. For example, there is no need for heating cartridges, or the like, to be integrated into the forming tool for that purpose.

By the induction heating apparatus, the forming tool can be heated at near-surface regions and, therefore, at a contact region for the workpiece.

In particular, the electrically conductive material has an electrical conductivity (at 25° C.) of at least $10^3$ S/m, preferably at least $10^4$ S/m, preferably at least $10^5$ S/m, and preferably at least $0.5 \cdot 10^6$ S/m (metallic electric conductivity). The electrically conductive material is a metal or other material that has corresponding electrical conductivity, such as graphite, or which has for example conductive fibres incorporated thereinto.

In an embodiment, the forming tool is made entirely of the electrically conductive material or has the electrically conductive material provided in a portion thereof which is arranged and configured such that the workpiece can be heated via heating said portion by the induction heating apparatus, in particular wherein said portion is arranged or formed at the contact region for the workpiece. Non-contact heating of the workpiece can then be effected via eddy current heating via the inductive heating mat.

Here, provision may be made for said portion to be formed from a layer of electrically conductive material which is fixedly connected to a support region of the forming tool or is placed on the support region. By use of such a layer of electrically conductive material, induction heating can be achieved even if the remainder of the forming tool is not made of an electrically conductive material. The corresponding eddy currents are then concentrated in this layer.

In an embodiment, the layer of electrically conductive material is a coating on the forming tool. Said coating is formed by electrodeposition, for example.

It is advantageous for the heating mat to be adapted to a shape of the component part to be fabricated. Optimized fabrication of a component part from a workpiece is thereby achieved.

In an embodiment, the induction heating apparatus comprises an ohmic heating function and, in particular, the workpiece can also be heated directly via the induction heating apparatus. For example, when the heating mat (having a coil arrangement) is operated in such a way that relatively large ohmic losses occur, then the heating mat is also heated through ohmic heating. This can additionally be utilized for applying heat to the workpiece. It is thus possible, for example, to have heat applied to the workpiece from the side of the forming tool and to have heat applied to the workpiece from the side of the inductive mat as well.

In an embodiment, at least one susceptor is positioned between the workpiece and the heating mat, wherein the at least one susceptor is permeable to electromagnetic fields of the heating mat such that the forming tool can be heated by the heating mat and that the susceptor can be heated, and in particular inductively heated, by the heating mat. The workpiece thereby can additionally receive heat from the side of the heating mat. The susceptor is configured in the form of a metal foil for example. It is permeable to electromagnetic fields such that eddy currents can be induced in the forming tool in response to a magnetic field of the inductive heating mat. Furthermore, eddy currents can be induced in the susceptor so that the susceptor is inductively heated.

In an embodiment, a punch is provided as a counter-element to the forming tool, in particular wherein the heating mat is integrated into the punch or the punch acts mechanically on the heating mat. Optimized shaping is thereby achieved.

In an embodiment, the inductive heating mat is a mat that comprises a coil apparatus. Magnetic fields can thereby be induced which, in turn, induce alternating currents. The coil apparatus can be arranged without a carrier on the mat (and can, in particular, form the mat), or the coil apparatus can be arranged on a carrier.

It is advantageous for the inductive heating mat to be at least one of the following:
flexurally flexible;
flexurally elastic;
flexurally limp;
shape-retaining
deformable and shape-retaining.

Optimized adaptability is thereby obtained and, in particular, component parts of a predetermined geometry can be produced. For example, a flexurally limp inductive heating mat can be advantageous where the heating mat is to be placed upon a workpiece of a specific shape and is intended to closely drape itself to the shape. A shape-retaining configuration can be advantageous in applications where, for example, a punch is provided as a counter-element to the forming tool. Here, a shape-retaining deformability, such as a shape-retaining, flexurally flexible configuration can be provided in order to form the inductive heating mat into a particular shape, which is then retained.

Inductive heating mats are described, for example, in DE 20 2015 100 080 U1 or in German utility model application No. 20 2018 103 385.9 of Jun. 15, 2018, not prepublished, of the same applicant. These documents are incorporated herein and made a part hereof by reference in their entirety and for all purposes.

The heating mat comprises a coil apparatus.

In an embodiment, the heating mat comprises a coil apparatus having a plurality of spiral-shaped windings, these being arranged in rows and columns. In particular, the spiral-shaped windings are configured such that, when a current flows through the spiral-shaped windings, a direction of current is at least approximately in the same direction in adjacent peripheral winding sections of spiral-shaped windings adjacent in a row or column.

By the corresponding configuration of the spiral-shaped windings it is ensured that electromagnetic fields do not cancel each other in the intermediate region between adjacent spiral-shaped windings. By the geometric arrangement of turns of the spiral-shaped windings via corresponding arrangement and configuration of the peripheral winding sections, it is ensured that, in said intermediate region, current will flow in the same direction in adjacent spiral-shaped windings, thereby preventing field attenuation.

Here, a peripheral winding section is a section of an outer turn.

For example, by providing one single spiral-shaped winding, an energy density distribution is created that will be strongly inhomogeneous. By the provision of a plurality of spiral-shaped windings having the configuration in accordance with the invention, a homogenization of the energy density distribution is obtained in use, when current flow occurs, whereby, in turn, a homogeneous heating of component parts can be implemented.

Homogeneous heating can thereby be implemented via the area of the carrier on which the spiral-shaped windings are arranged.

The spiral-shaped windings on the carrier, in a sense, form islands, wherein said islands are wound in such a way that field cancellation in the intermediate region between adjacent spiral-shaped windings is prevented.

In principle, the area of the corresponding induction heating apparatus can be arbitrarily extended.

In particular, provision is made for a first spiral-shaped winding to comprise a first peripheral winding section and for a second spiral-shaped winding to comprise a second peripheral winding section, wherein the first spiral-shaped winding and the second spiral-shaped winding are adjacent and wherein the first peripheral winding section and the second peripheral winding section are adjacent, and wherein when current flow occurs, the direction of current is at least approximately in the same direction in the first peripheral winding section and the second peripheral winding section.

Field cancellation is thereby prevented in the intermediate region between the adjacent first spiral-shaped winding and the second spiral-shaped winding. This in turn permits homogeneous heating of a component part that is heated by the corresponding induction heating apparatus.

For the same reason it is advantageous if, when a current flows in adjacent peripheral winding sections of adjacent spiral-shaped windings, the direction of current is at least approximately in the same direction in both a row and a column. Field cancellation in intermediate regions is thereby prevented in the intermediate regions between adjacent spiral-shaped windings on a two-dimensional area.

Provision may be made for adjacent spiral-shaped windings to be spaced apart or to overlap each other, depending on the particular application.

When adjacent spiral-shaped windings are spaced apart from one another, then corresponding adjacent peripheral winding sections are also spaced. When adjacent spiral-shaped windings overlap one another, provision may be made for adjacent peripheral winding sections to cross each other in the projection onto the carrier.

To provide for a homogeneous energy density distribution, it is advantageous for the spiral-shaped windings to be arranged, with respect to the columns and rows, in a two-dimensional grid on the carrier. Homogeneous coverage of the carrier can thereby be achieved, which in turn allows homogeneous energy density distribution to be implemented.

It is particularly advantageous for the grid to be a rectangular grid and, advantageously, a square grid in order to achieve homogeneous energy density distribution and, thereby, homogeneous heatability of a component part.

It is advantageous for spiral-shaped windings of at least the same type to be of identical configuration with respect to an outer envelope. High homogeneity can thereby be achieved.

For the same reason it is advantageous for spiral-shaped windings of at least the same type to be of identical configuration with respect to the number of turns.

It has proven advantageous for a spiral-shaped winding to comprise at least two turns and in particular at least three turns.

It has also proven advantageous, in order to implement uniform heatability, for a spiral-shaped winding to comprise no more than eight turns and in particular no more than seven turns.

It is advantageous for the coil apparatus to comprise a first type of spiral-shaped windings in which turns run away from a starting point, going outwards at an increasing distance from the starting point, and to comprise a second type, in which turns run towards a starting point, going from the outside to the inside, at a decreasing distance to the starting point. Here the corresponding direction (outwards or inwards) can be related to the flow of current. By the provision of two different types of spiral-shaped windings, it is easily implemented that the flow of current is in approximately the same direction in peripheral winding sections of adjacent spiral-shaped windings.

It is then particularly advantageous for spiral-shaped windings of the first type and of the second type to be arranged in the rows and columns in an alternating manner. The effect can thereby be achieved in a simple manner that, in both the rows and columns, the peripheral winding sections of adjacent spiral-shaped windings carry a current in at least approximately the same current direction. This in turn prevents field cancellation in the corresponding regions.

Advantageously, a sense of rotation of an electrical current is in the same sense within a spiral-shaped winding, and the senses of rotation are in opposite senses in adjacent spiral-shaped windings. The effect can thereby be provided in a simple manner that adjacent peripheral winding sections of adjacent spiral-shaped windings carry currents in at least approximately the same direction.

A spiral-shaped winding is distinguished in that, starting from a point (starting point), or an axis, the distance increases or decreases. In principle, such increase or decrease can be monotonic. It is also possible for the corresponding spiral-shaped winding to be formed via at least approximately straight turn sections. With this arrangement, the increase or decrease does not occur monotonically; instead, the increase or decrease occurs only in sections. Such a spiral-shaped winding having straight turn sections is simple to produce.

It is then advantageous for adjacent peripheral winding sections of adjacent spiral-shaped windings to be oriented at least approximately parallel to each other. The effect can thereby be achieved in a simple manner that these adjacent peripheral winding sections carry the current in at least approximately the same direction.

Provision is made for a plurality of spiral-shaped windings to be electrically connected in series. In particular, adjacent spiral-shaped windings are electrically connected in series. The effect can thereby be achieved in a simple manner that current flow is in the same direction in adjacent peripheral winding sections.

For example, the spiral-shaped windings in a row or in a column are electrically connected in series and, correspondingly, rows or columns of spiral-shaped windings are then electrically connected in series. As a result of this, the current flow will follow a meandering path, relative to the direction of main current flow.

Provision may be made for an electrical connection between adjacent spiral-shaped windings within a row or column to be realized via peripheral winding sections or via a connection between starting points for turns of a spiral-shaped winding. It is thereby possible for spiral-shaped windings to be connected in an "inward orientation" and in an "outward orientation". This in turn allows different senses of rotation for the flow of current within adjacent spiral-shaped windings. This in turn provides a simple way of implementing at least approximately the same current direction in adjacent peripheral winding sections of adjacent spiral-shaped windings.

In particular, the electrical connection between peripheral winding sections and starting points within a row or within a column is realized in an alternating manner. An alternating sense of rotation of the current can thereby be achieved. A homogeneous energy density is thereby implemented.

Advantageously, an electrical connection between adjacent rows or columns is realized via a peripheral winding section and a starting point for turns of adjacent spiral-shaped windings. This provides a simple way of achieving electrical connection between adjacent rows or columns.

It is advantageous for the coil apparatus to comprise one or more flat coils. This provides a simple way of implementing an area-type induction heating apparatus.

In an exemplary embodiment, the coil apparatus is formed by at least one high-frequency Litz wire. This provides a simple way of implementing a coil apparatus which is arranged on a carrier.

It is advantageous for the at least one high-frequency Litz wire to be held to a carrier via one or more holding threads. This provides a simple way for the at least one high-frequency Litz wire, laid into the corresponding form, to be fixed in place on the carrier. A flexible carrier having a flexible high-frequency Litz wire can thereby be implemented. An induction heating apparatus can be implemented, in particular in the form of an area heating apparatus, which is flexurally flexible. It is thereby possible, for example, for curved component parts to be heated or for a corresponding heating mat to be integrated into a curved tool.

In particular, provision is made for the carrier to be a mesh network and for the at least one high-frequency Litz wire to be sewn in place to the mesh network. This provides a simple way of connecting a high-frequency Litz wire in a defined geometric position with the spiral-shaped windings to the carrier.

In accordance with an exemplary embodiment of the invention, there is provided a method for producing a component part from a composite material by way of a forming tool, in which method a workpiece is placed in contact against a contact region of the forming tool and at least a portion of the contact region of the forming tool is non-contact heated by an inductive heating mat, wherein the workpiece is positioned between the contact region and the heating mat.

The method in accordance with the invention has the advantages that have already been described in connection with the tool apparatus in accordance with the invention.

Further advantageous embodiments of the method in accordance with the invention have already been discussed in the context of the tool apparatus in accordance with the invention.

In particular, the method in accordance with the invention can be carried out on the tool apparatus in accordance with the invention, or the tool apparatus can be operated using the method in accordance with the invention.

Here it is advantageous for the heating mat itself to be heated by ohmic heat and for it to heat the workpiece via ohmic heat. The workpiece can thereby be heated from two sides, namely from the side of the forming tool side and from the side of the heating mat. Alternatively or in addition, it is advantageous for a susceptor to be positioned between the heating mat and the workpiece, which susceptor is permeable to electromagnetic fields of the heating mat such that the forming tool is (inductively) heated by the heating mat and the susceptor is heated (in particular inductively heated) by the heating mat. This also provides a way of heating the workpiece from the side of the heating mat.

It is particularly advantageous for the heating mat to be adapted or to be adaptable to a shape of a workpiece and in particular to a shape of a component part that is to be produced. Many capabilities of use are thereby obtained.

The following description of preferred embodiments serves in conjunction with the drawings to explain the invention in greater detail.

DETAILED DESCRIPTION OF THE INVENTION

Figure 1:
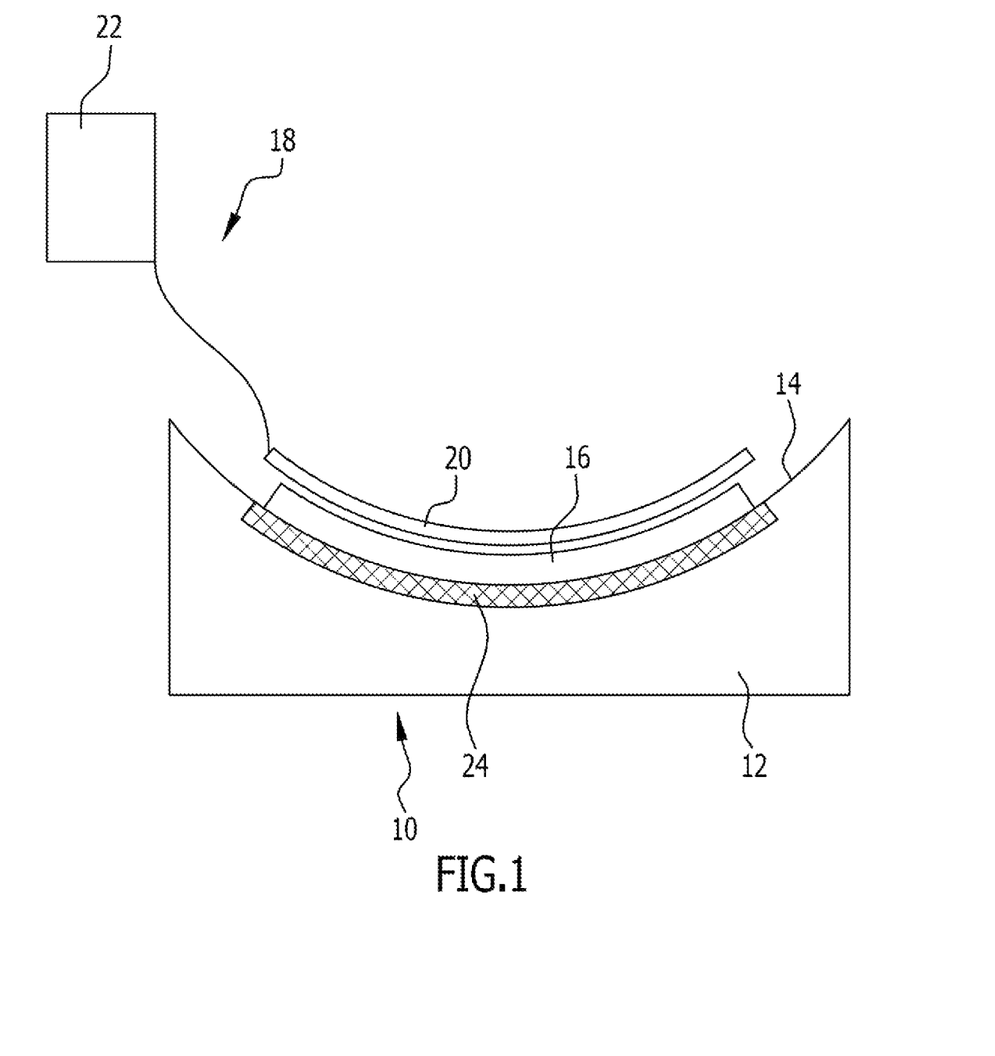
FIG. 1 shows, in a schematic view, an exemplary embodiment of a tool apparatus for manufacturing a composite material component part.

An exemplary embodiment of a tool apparatus, shown schematically in FIG. 1 and designated therein by 10, comprises a forming tool 12. The forming tool 12 has a contact region 14 for a workpiece 16. The workpiece 16 is fabricated into a composite material component part, for example a fibrous composite material component part.

The contact region 14 is adapted in its shape to conform to a component part that is to be fabricated. The contact region 14 is shown as having a curved shape in FIG. 1.

In an embodiment, the forming tool 12 is made of an electrically conductive material, such as a metallic material, and is in particular made entirely of a metallic material. It is also possible for the material to be for example non-metallic and to comprise electrically conductive fibres, such as carbon fibres, for providing an electrical conductivity of in particular at least $10^4$ S/m and preferably at least $0.5 \cdot 10^6$ S/m.

An induction heating apparatus 18 is provided. This comprises an inductive heating mat 20 and a high frequency source device 22.

Examples of embodiments of an induction heating apparatus 18 and, in particular, of an inductive heating mat 20 are described in more detail below.

The workpiece 16 is placed against the contact region 14 of the forming tool 12. Here, the workpiece 16 is positioned between the inductive heating mat 20 and the forming tool 12; the inductive heating mat 20 is positioned in spaced relation to the forming tool 12 and is thereby also in spaced relation to the contact region 14 of the forming tool 12.

To fabricate a component part from a composite material, a structure of prepreg layers is used as the workpiece 16, for example. These are layers of woven fabric which are impregnated with a resin. The resin can be cured by heating the workpiece 16.

In accordance with the invention, provision is made for the forming tool 12 to be non-contact heated via the inductive heating mat 20. The inductive heating mat 20, when it has a corresponding alternating current applied thereto, causes a heating region 24 of the forming tool 12 to heat up. Said heating region 24 is located in the contact region 14 in particular. The inductive heating mat 20, when it has a corresponding alternating current flowing therethrough, creates an alternating magnetic field which induces eddy currents in the forming tool 12 and, in particular, in the heating region 24 of the forming tool 12. The eddy current losses lead to heating at the heating region 24 and therefore at the contact region 14. This in turn allows the workpiece 16, placed in contact against the contact region 14, to be heated up.

The inductive heating mat 20, positioned in spaced relation to the tool 12, heats up the tool 12 at the heating region 24 thereof.

In addition, provision may be made that, in response to the current flow occurring in the inductive heating mat 20, the inductive heating mat 20 itself is heated due to ohmic losses. When the heating mat 20 is placed to rest on the workpiece 16 or when it is placed to communicate with the workpiece 16 through a heat-conductive layer, then the workpiece 16 can also be heated directly via the heating mat 20. In such an embodiment, the workpiece 16 receives heat from two sides, namely from the heating region 24 (with the eddy currents occurring there being caused by the inductive heating mat 20), and from ohmic heating of the inductive heating mat 20 at an opposite side thereof.

Figure 2:
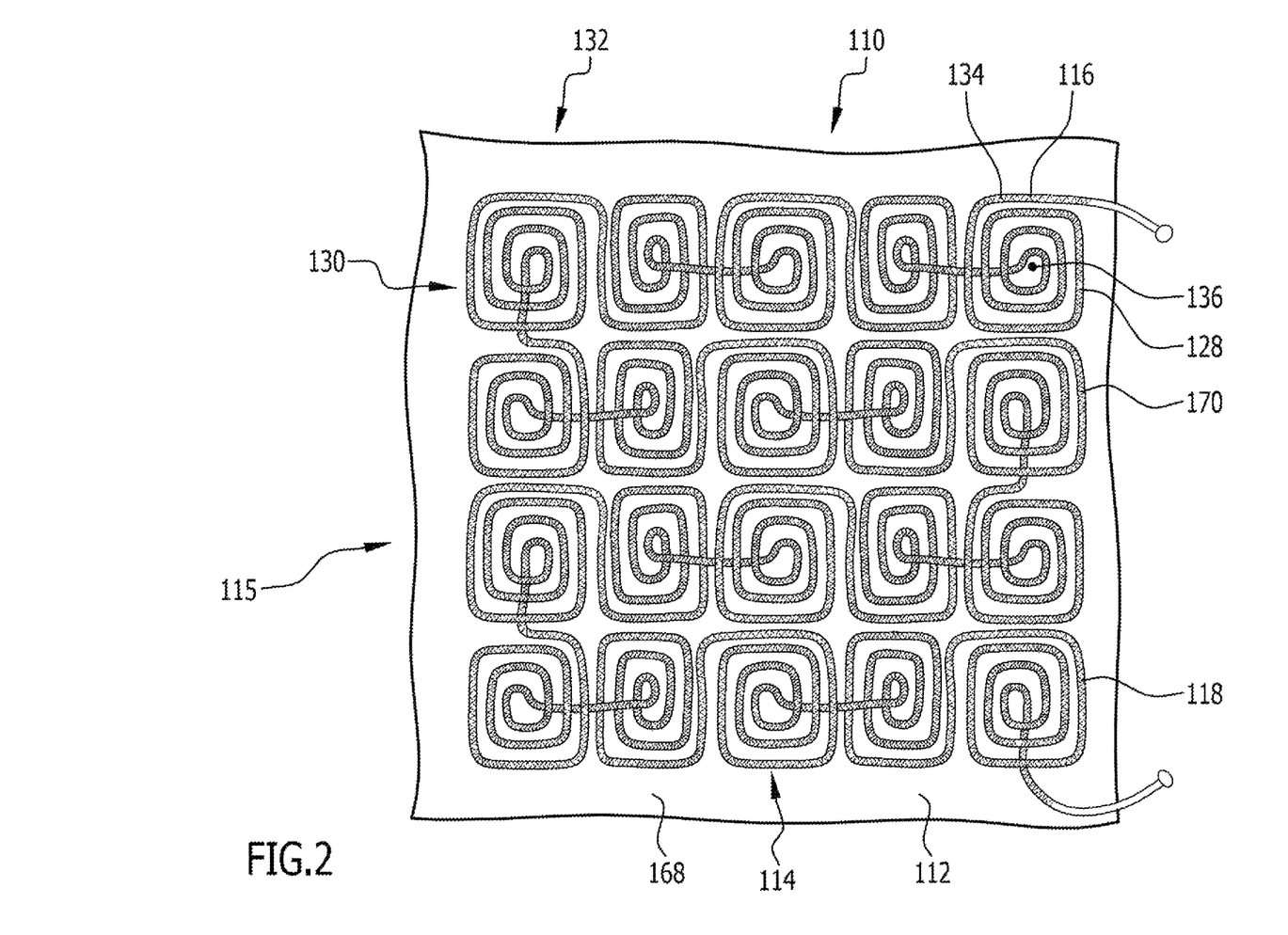
FIG. 2 shows, in top view, an exemplary embodiment of a heating mat in an induction heating apparatus.

An exemplary embodiment of an induction heating apparatus, shown in a top view in FIG. 2 and designated therein by 110, comprises a carrier 112. Said carrier 112 is configured in the form of a mesh network.

The corresponding induction heating apparatus is described in DE 20 2015 100 080 U1. This document is incorporated herein and made a part hereof by reference in its entirety and for all purposes.

The mesh network 112 is, for example, a textile structure, such as a woven fabric or a knitted fabric.

The mesh network 112 comprises meshes of strands that are, in particular, of a rectangular or square shape. The strands are made from a thread material for example.

The carrier 112 having the mesh network is capable of being flexed as a whole.

Arranged on the carrier 112 is a coil apparatus 114. The coil apparatus is formed by a current-carrying high-frequency Litz wire 116. An inductive heating mat 115 corresponding to the heating mat 20 is thereby formed.

The high-frequency Litz wire 116 serves to carry a high-frequency alternating current. The high-frequency Litz wire 116 is a wire bundle of individual wires, each wire being electrically insulated from another wire by an insulating material. It is thereby possible to effectively increase the cross-sectional area over which electrical current flows when compared to a solid wire, reducing the influence of the skin effect. Furthermore, the crowding of charge carriers towards one side of the corresponding conductor caused by the magnetic field of a coil produced therefrom (proximity effect) is also reduced.

The bundle of wires in an embodiment is arranged in a sheath 118 which is of multi-layer configuration in particular.

For further details regarding the configuration of the high-frequency Litz wire 116, reference is made to DE 10 2013 111 266 A1. This document is incorporated herein and made a part hereof by reference in their entirety and for all purposes.

Figure 3:
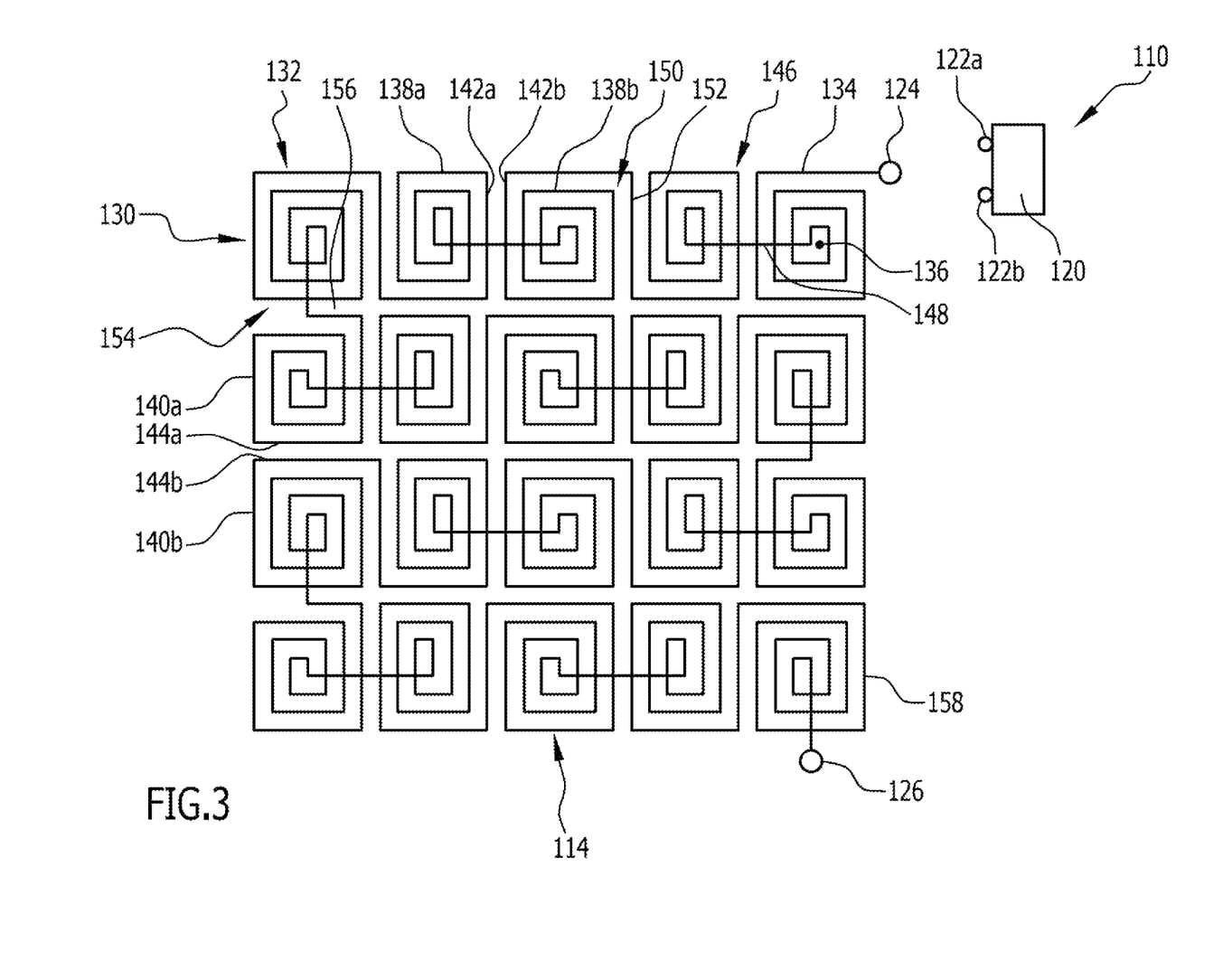
FIG. 3 shows, in a schematic view, an exemplary embodiment of an induction heating apparatus, showing a coil apparatus of the heating mat in accordance with FIG. 2.

The coil apparatus 114 has a high-frequency source device 120 associated therewith (cf. FIG. 3). In use of the induction heating apparatus 110, the individual wires in the bundle of wires of the high-frequency Litz wire 116 are operatively and electrically connected to corresponding terminals 122a, 122b of the high-frequency source device 120.

To this end, the high-frequency Litz wire 116 has a terminal 124 at a first end thereof and has a terminal 126 at a second end thereof.

The high-frequency source device 120 serves to generate a high-frequency electromagnetic alternating field which is applied to the high-frequency Litz wire 116. The frequency is at least 20 KHz and is typically approximately 150 kHz.

The high-frequency source device 120 comprises an electronic switching device for creating the corresponding alternating field when the primary electrical source is a direct current source.

The high-frequency Litz wire 116 is a linearly and flexurally flexible cable.

The coil apparatus 114 comprises a plurality of spiral-shaped windings 128. These spiral-shaped windings 128 are arranged on the carrier 112 in rows 130 and columns 132. For forming an area-type induction heating apparatus 110, the spiral-shaped windings 128 are arranged on the carrier 112 in a uniformly distributed manner. The spiral-shaped windings 128 are formed on the high-frequency Litz wire 116.

In particular, by virtue of the rows 130 and columns 132, the spiral-shaped windings 128 are arranged on the carrier 112 in a two-dimensional grid. This two-dimensional grid is in particular a rectangular grid and is preferably a square grid.

A respective spiral-shaped winding 128 comprises a plurality of turns 134 which are related to a starting point 136. A starting point 136 lies on a winding axis of the turns 134 of the spiral-shaped winding 128. The winding axis is oriented perpendicularly to the carrier 112. The spiral of a spiral-shaped winding 128 is defined as a curve receding from or approaching the starting point 136, or winding axis. Here the recession can be increasing monotonically or the approach can be decreasing monotonically, or the recession and the approach can be increasing and decreasing in sections, respectively.

The arrangement of the spiral-shaped windings 128 on the carrier 112 determines the temperature distribution that will occur at an object that is to be heated.

The coil apparatus 114 is configured such that a homogeneous field distribution is achieved across the area of the coil apparatus 114 and such that, in the region between adjacent spiral-shaped windings 128 in particular, a "field cancellation" of the generated magnetic fields is prevented.

When a current is passed through a spiral-shaped winding 128, the sense of rotation of the current flowing therethrough is in the same sense within a spiral-shaped winding 128. In accordance with the invention, it is provided that in both rows 130 and columns 132, the sense of rotation for the current flow through adjacent spiral-shaped windings 138a, 138b and 140a, 140b respectively is in opposite senses. The described cancellation of the electromagnetic field can thereby be prevented.

The spiral-shaped windings 128 of the coil apparatus 114 are electrically connected in series. In the illustrated exemplary embodiment (FIGS. 2, 3), the spiral-shaped windings 128 are serially connected, one after another, in a row 130. The corresponding rows 130 are themselves serially connected.

The coil apparatus 114 comprises two types of spiral-shaped windings 128, namely a first type in which corresponding turns 134 run from the respective starting point 136 outwards at an increasing distance (at least in sections thereof) from the starting point 136. In FIG. 3, the spiral-shaped windings 138a and 140a are of the first type.

In the spiral-shaped windings 128 of a second type, the corresponding turns 134 run towards the starting point 136, going from the outside to the inside, at a decreasing distance (at least in sections thereof) to the starting point 136. In the exemplary embodiment in accordance with FIG. 3, the spiral-shaped windings 138b and 140b are of the second type.

Here the corresponding winding direction of the first type and of the second type is related to the corresponding flow of current.

In a row 132, the spiral-shaped windings 128 of the first type and of the second type are arranged in an alternating manner.

Likewise, the spiral-shaped windings 128 of the first type and of the second type are arranged in an alternating manner within a column 132.

This results in that both within a row 130 and within a column 132, with respect to adjacent spiral-shaped windings 128, when current flow occurs, the sense of rotation for the current is in opposite senses, in an alternating manner.

The respective spiral-shaped windings 128 comprise peripheral winding sections that face towards adjacent spiral-shaped windings. As an example, the spiral-shaped winding 138a has a peripheral winding section 142a which is adjacent to a corresponding peripheral winding section 142b of the spiral-shaped winding 138b.

Here the peripheral winding sections 142a and 142b are arranged such that, when current flow occurs in the coil apparatus 114, they will carry the current in at least approximately the same direction.

A "cancellation" of the generated electromagnetic fields is thereby prevented in the corresponding region.

Correspondingly, peripheral winding sections 144a, 144b of spiral-shaped windings 140a, 140b adjacent in a row are arranged such that they will carry the current in at least approximately the same direction.

The arrangement of the peripheral winding sections 142a, 142b, 144a, 144b is achieved by corresponding arrangement of spiral-shaped windings 128 of the first type and of the second type, which arrangement is an alternating arrangement in both the rows 130 and the columns 132.

For establishing the series connection of the spiral-shaped winding 128, adjacent spiral-shaped windings 128 within a row 130 are electrically interconnected to each other. Within a row 130, a first type of connection 146 is provided in which starting points 136 of adjacent spiral-shaped windings 128 are connected together (by a corresponding section 148 of the high-frequency Litz wire 116).

In a second type of connection 150, the connection between adjacent spiral-shaped windings 128 is realized via a peripheral winding section 152.

The first connection type 146 and the second connection type 150 succeed each other in an alternating manner between adjacent spiral-shaped windings 128 within a row 130.

A third electrical connection type 154 is provided for effecting electrical connection between adjacent rows 130. Here electrical connection is made between a starting point 136 and a peripheral winding section 156.

The spiral-shaped windings 128 are arranged in the form of flat coils on the carrier 112 by a corresponding "laying" of the high-frequency Litz wire 116.

In an exemplary embodiment, the spiral-shaped windings 128 (FIGS. 2, 3) have straight sections 158. The spiral-shaped winding 128 is thereby not one that recedes from the corresponding starting point 136 in a monotonically increasing manner or that approaches same in a monotonically decreasing manner. But instead, with respect to these sections, the recession or approach from or to the corresponding starting point 136 increases or decreases in sections, respectively.

In the exemplary embodiment of spiral-shaped windings 128 having straight sections 158, it is preferred for adjacent peripheral winding sections 142a, 142b and 144a, 144b, respectively, to be oriented parallel to each other. This results in parallel current directions there.

It is, in principle, possible for adjacent spiral-shaped windings to be spaced apart from one another and for their corresponding adjacent peripheral winding sections to be spaced apart from one another.

This is how the spiral-shaped windings 128 in accordance with the exemplary embodiment of FIGS. 2, 3 are arranged.

It is also possible for adjacent spiral-shaped windings to overlap each other, thereby placing turns in overlying relationship. (The high-frequency Litz wire 116 is insulated towards the outside.)

It is thereby possible for peripheral winding sections that are adjacent to each other to cross each other (in the projection onto the carrier 112).

Each spiral-shaped winding 128 of the coil apparatus 114 comprises a plurality of turns 134. Preferably, each spiral-shaped winding 128 has at least two and preferably at least three turns 134. It is further advantageous for each spiral-shaped winding 128 to comprise no more than eight and preferably no more than seven turns 134.

It is, in principle, advantageous for the spiral-shaped windings 128 of at least the same type to be of identical configuration with respect to their number of turns and outer envelope area.

The mesh network has a first side 168 and a second side opposing the first side. It is preferred for the high-frequency Litz wire 116 to be arranged exclusively or for the most part on the first side 168.

The corresponding winding axes of the spiral-shaped windings 128 are transverse and in particular perpendicular to the carrier 112.

The high-frequency Litz wire 116 is held to the carrier 112, and is in particular sewn in place together therewith, by way of one or more holding threads 170. Such fixation via holding threads also provides the winding structure of the coil device 114 on the carrier 112.

With respect to the fixation of the coil device 114 to the mesh network of the carrier 112 via holding threads, reference is made to DE 10 2013 111 266 A1. This document is incorporated herein and made a part hereof by reference in its entirety and for all purposes.

Provision may be made for the coil apparatus 114 to have associated therewith a magnetic flux concentrator layer which is in particular arranged on the side of the carrier 112 that faces away from the first side 168. Such a magnetic flux concentrator layer which is made of a material of corresponding magnetic permeability serves to concentrate the magnetic flux generated during operation of the coil apparatus 114 into a field in front of the first side 168.

Furthermore, outer electrical insulating layers can be provided between which the carrier 112 having the coil apparatus 114 fixed thereto and, optionally, the magnetic flux concentrator layer are then arranged. Such outer electrical insulating layers are, for example, made of a silicone material.

The outer electrical insulating layers and the magnetic flux concentrator layer are of flexible configuration.

The carrier 112 is capable of being flexed. The high-frequency Litz wire 116 can be flexed together with the carrier 112. The connection of the high-frequency Litz wire 116 to the carrier 112 via the one or more holding threads provides the capability of flexing. The carrier 112 together with the coil apparatus 114 forms a flexible heating mat 172.

The induction heating apparatus 110 can be formed into a variety of different geometric shapes. For example, single curvature shapes or multiple curvature shapes are possible.

The induction heating apparatus is configured as an area induction heating apparatus in which, by the arrangement of the spiral-shaped windings 128, regions having electromagnetic fields that cancel each other out are avoided. It is thereby possible to achieve homogeneous heating with high flexibility.

The spiral-shaped windings 128 on the carrier 112 form field-generating islands. By a corresponding configuration of the islands, the "heating surface" can, in principle, be arbitrarily extended or its size can be adjusted. This is then achieved by a corresponding "laying" of the high-frequency Litz wire 116 on the carrier 112.

It is also possible for the induction heating apparatus to comprise, as a heating mat, a coil apparatus having a plurality of spiral-shaped windings which are arranged in rows and/or columns, wherein the at least one coil apparatus is formed by a tube through which a heat transfer medium can be flowed.

The tube can be arranged on a carrier, or a carrier-free heating mat, and in particular, a flexible (and also shape-retaining, flexible) heating mat can be formed by the tube. In this context, reference is made to the German utility model application No. 20 2018 103 385.9 of Jun. 15, 2018 of the same applicant. This document is incorporated herein and made a part hereof by reference in its entirety and for all purposes.

It is, in principle, possible for the corresponding inductive heating mat 20 to be of a shape-retaining configuration. Here the shape retention can be permanent or it can be variable. For example, where the coil apparatus is formed by a tube, the corresponding heating mat can easily be formed to a shape-retaining configuration.

The heating mat can be of flexible configuration or configured with a capability of being flexed. Here it can be configured to be flexurally limp or it can be configured to be flexurally flexible in the manner of a plastic deformability. For example, if the carrier 112 is correspondingly configured, a flexurally flexible configuration can be achieved. Thus, the heating mat 20 can also be flexurally flexible and shape-retaining.

Figure 4:
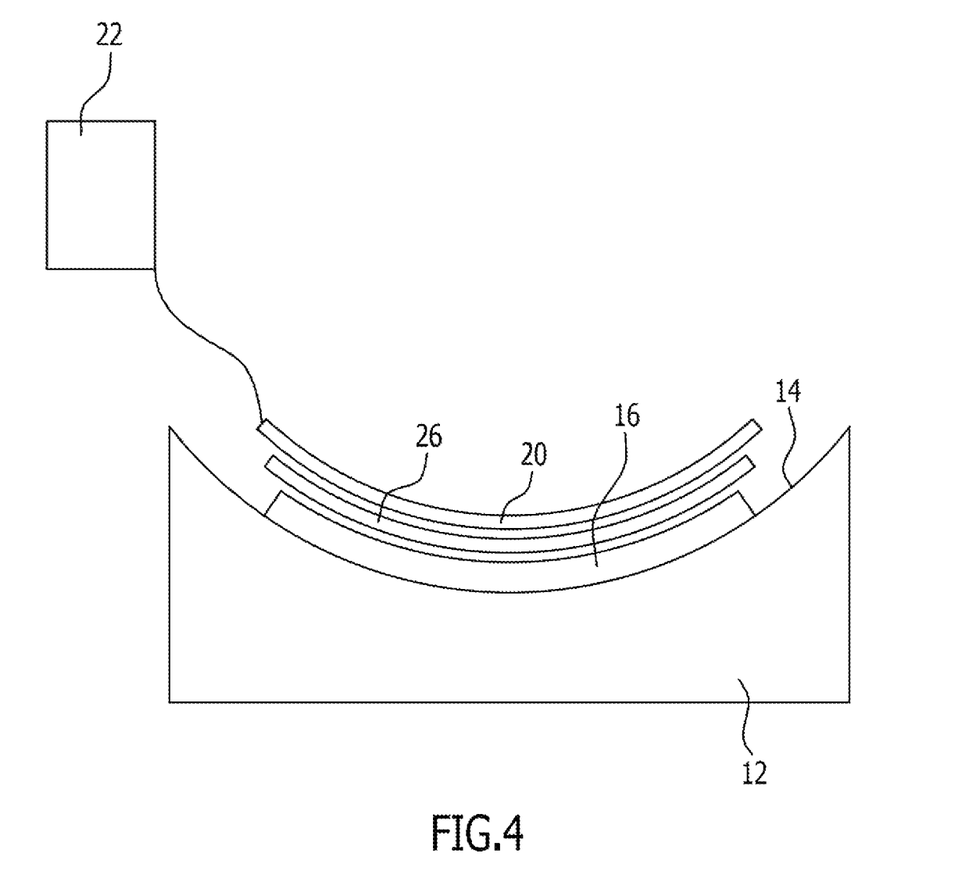
FIG. 4 shows, in a schematic view, a further exemplary embodiment of a tool apparatus.

A further exemplary embodiment of a tool apparatus, shown schematically in FIG. 4, is constructed in generally the same manner as the tool apparatus 10 having the forming tool 12 and the inductive heating mat 20.

In this embodiment, at least one susceptor 26 is provided, said susceptor 26 being positioned between the inductive heating mat 20 and the forming tool 12 and hence the contact region 14. The susceptor 26 forms a corresponding intermediate layer between the inductive heating mat 20 and the workpiece 16.

The (at least one) susceptor 26 serves to assist the heating process.

By way of example, the susceptor 26 is formed as a metal sheet or metal foil. It is also adapted to the shape of the workpiece or the component part that is to be produced.

Here, the susceptor 26 is configured in such a manner that it is permeable to the electromagnetic fields of the inductive heating mat 20 such that the inductive heating mat 20 can inductively heat the corresponding heating region 24 at the forming tool 12. Furthermore, the susceptor 26 is configured such that it can also have eddy currents induced therein so that eddy current losses occur, thereby enabling the workpiece 16 to also be inductively heated from the side of the inductive heating mat 20 via the susceptor 26.

The inductive heating mat 20 thereby inductively heats the susceptor 26 and the forming tool 12. In addition, by corresponding adjustment of an operating point, the susceptor 26 can further be heated by ohmic losses via the inductive heating mat 20.

Figure 5:
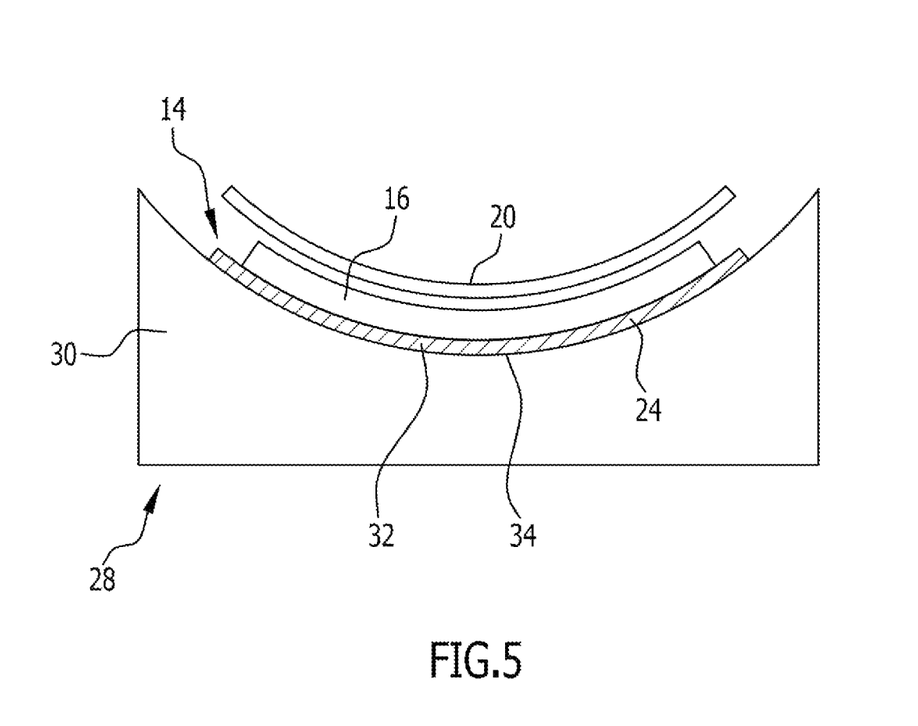
FIG. 5 shows, in a schematic view, a further exemplary embodiment of a tool apparatus.

In a further exemplary embodiment of a tool apparatus, shown schematically in FIG. 5 and designated therein by 28, there is provided a forming tool 30 made of an electrically non-conductive material, such as a non-metallic material. A layer 32 of electrically conductive material, such as a metallic material, is arranged on the forming tool 30. In an embodiment, this layer 32 is a coating of a metallic material that is applied to a support region 34 of the forming tool 30. For example, a corresponding metallic layer is electrodeposited on the support region 34.

In an alternative embodiment, the layer 32 of electrically conductive material is placed upon the forming tool 30; by way of example, the layer 32 is placed thereon in the form of a metallic foil.

The workpiece 16 is positioned on the layer 32. The layer 32 thereby forms the contact region 14 of the forming tool 30.

As above, an inductive heating mat 20 is positioned in spaced relation to the forming tool 30 including the layer 32, i.e. the inductive heating mat 20 is in spaced relation to the layer 32. The workpiece 16 is positioned between the inductive heating mat 20 and the layer 32.

The inductive heating mat 20 induces eddy currents in the layer 32 of electrically conductive material. No eddy currents are generated in the forming tool 30 outside the layer 32.

The layer 32 thereby forms the heating region 24.

Otherwise, the tool apparatus 28 works in the same manner as discussed for the tool apparatus 10. In particular, one or more susceptor layers can be used with the tool apparatus 28.

Figure 6:
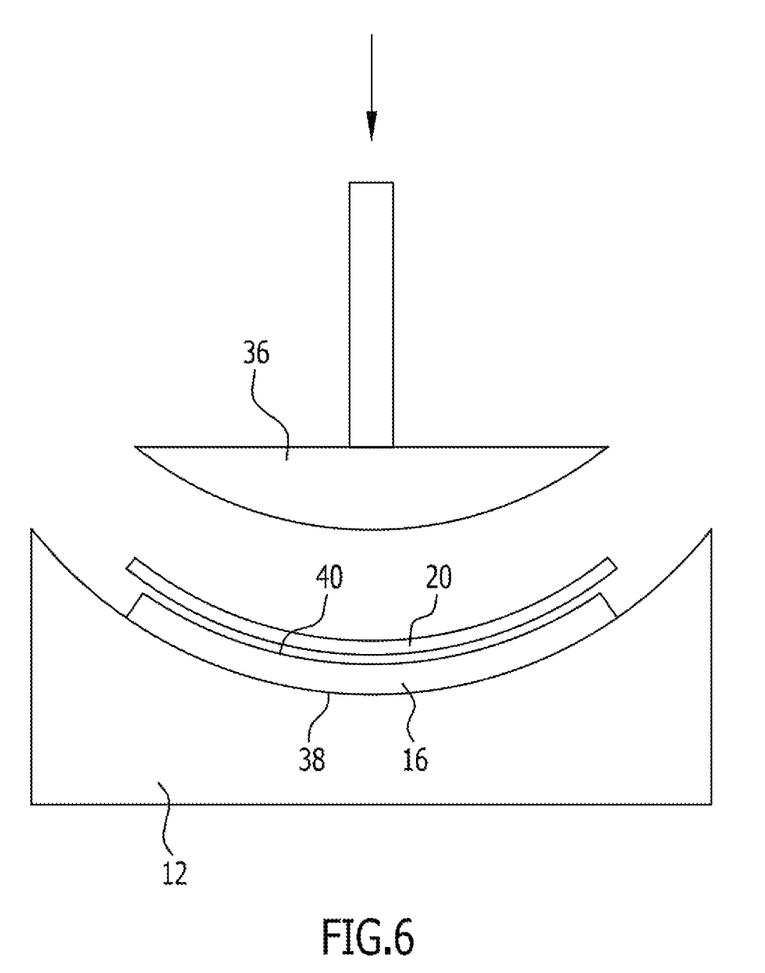
FIG. 6 shows, in a schematic view, a further exemplary embodiment of a tool apparatus.

A further exemplary embodiment of a tool apparatus, shown in FIG. 6, is constructed in generally the same manner as the tool apparatus 10. Like reference numerals indicate like elements.

A punch 36 is provided as a counter-element to the corresponding forming tool 12. The workpiece 16 can be formed on a first side 38 thereof via the forming tool 12. It can be formed on a second, opposite side 40 thereof via the punch 36.

Here, it is possible for the inductive heating mat 20 to be integrated into the punch 36 or to be part of the punch. Preferably, the punch 36 is then not made of a metallic material, or the punch 36 is made of metallic material in a region thereof that is separated by a sufficiently large distance from the inductive heating mat 20.

In accordance with the invention, a tool apparatus is provided in which a heating region 24 is heated against which a workpiece 16 is in contact. The heating region 24 is heated by inductive heating via eddy current losses via an inductive heating mat 20.

For example, this can also be utilized as a retrofit application for heating a pre-existing forming tool 12 without need for having heating cartridges, or the like, integrated thereinto.

Component parts formed of composite materials can be produced on a corresponding tool apparatus 10 without the need for employing an autoclave.

Sheet-like component parts in particular can be produced on a forming tool 12.

The use of an inductive heating mat 20 provides great flexibility in shaping the component part. By the inductive heating of the heating region 24, heat from the heat source reaches the component part to be heated not only by heat conduction.

The forming tool 12 can be configured independently of the heating because, via the spaced inductive heating mat 20, the heating is contactless. Use of the induction heating technology as a retrofit to a forming tool 12 is possible.

Near-surface heating is possible.

Moving workpieces 16, for example, can also be easily heated.

The inductive heating mat 20, adapted to a size of a component part that is to be fabricated, allows localized and near-surface heating to be achieved on the forming tool 12.

If the inductive heating mat 20 is operated at a corresponding operating point, an ohmic resistance at the inductive heating mat 20 and a corresponding ohmic heat can additionally be utilized to heat a workpiece 16.

The component part to be produced can be a composite material component part formed entirely of composite, or it can be a component part comprising a composite material component. For example, a tool apparatus in accordance with the invention can also be employed for joining together a metal part and a composite material component part for example.

LIST OF REFERENCE CHARACTERS 10 tool apparatus
12 forming tool
14 contact region
16 workpiece
18 induction heating apparatus
20 inductive heating mat
22 high frequency source device
24 heating region
26 susceptor
28 tool apparatus
30 forming tool
32 layer of electrically conductive material
34 support region
36 punch
38 first side
40 second side
110 induction heating apparatus
112 carrier
114 coil apparatus
115 inductive heating mat
116 high-frequency Litz wire
118 sheath
120 high-frequency source device
122*a* terminal
122*b* terminal
124 terminal
126 terminal
128 spiral-shaped winding
130 row
132 column
134 turn
136 starting point
138*a* spiral-shaped winding
138*b* spiral-shaped winding
140*a* spiral-shaped winding
140*b* spiral-shaped winding
142*a* peripheral winding section
142*b* peripheral winding section
144*a* peripheral winding section
144*b* peripheral winding section
146 first connection type
148 section
150 second connection type
152 peripheral winding section
154 third electrical connection type
156 peripheral winding section
158 straight section
170 holding thread
172 heating mat

What is claimed is:

1. Tool apparatus for producing a composite material component part, said tool apparatus comprising:
   a forming tool having a contact region for a workpiece;
   wherein the forming tool is made, in at least a portion thereof, of an electrically conductive material; and
   an induction heating apparatus having an inductive heating mat;
   wherein the inductive heating mat is a mat that comprises a coil apparatus;
   wherein the inductive heating mat is flexurally flexible;
   wherein the heating mat is positioned in spaced relation to the forming tool;
   wherein a positioning of the workpiece is provided between the heating mat and the forming tool, in contact with the forming tool; and
   wherein heating of the forming tool is provided, in at least a portion thereof, by the induction heating apparatus.

2. Tool apparatus in accordance with claim 1, wherein the electrically conductive material has an electrical conductivity of at least $10^3$ S/m.

3. Tool apparatus in accordance with claim 1, wherein the forming tool is made entirely of the electrically conductive material or has the electrically conductive material provided in a portion thereof which is arranged and configured such that the workpiece is heatable via heating said portion by the induction heating apparatus.

4. Tool apparatus in accordance with claim 1, wherein the portion is formed from a layer of electrically conductive material which is fixedly connected to a support region of the forming tool or is placed on the support region.

5. Tool apparatus in accordance with claim 4, wherein the layer of electrically conductive material is a coating on the forming tool.

6. Tool apparatus in accordance with claim 1, wherein the heating mat is adapted to a shape of the component part to be fabricated.

7. Tool apparatus in accordance with claim 1, wherein the induction heating apparatus comprises an ohmic heating function.

8. Tool apparatus in accordance with claim 1, wherein at least one susceptor is positioned between the workpiece and the heating mat, wherein the at least one susceptor is permeable to electromagnetic fields of the heating mat such that the forming tool is heatable by the heating mat, and wherein the at least one susceptor is heatable by the heating mat.

9. Tool apparatus in accordance with claim 1, wherein a punch is provided as a counter-element to the forming tool.

10. Tool apparatus in accordance with claim 1, wherein the inductive heating mat is at least one of (i) flexurally elastic; (ii) flexurally limp; (iii) shape-retaining; and (iv) deformable and shape-retaining.

11. Tool apparatus in accordance with claim 1, wherein the inductive heating mat comprises a carrier and a coil apparatus arranged on the carrier.

12. Tool apparatus in accordance with claim 1, wherein the coil apparatus comprises a plurality of spiral-shaped windings which are arranged in rows and columns.

13. Tool apparatus in accordance with claim 11, wherein the spiral-shaped windings are configured such that, when a current flows through the spiral-shaped windings, a direction of current is at least approximately in the same direction in adjacent peripheral winding sections of spiral-shaped windings adjacent in a row or column.

14. Tool apparatus in accordance with claim 12, wherein a first spiral-shaped winding comprises a first peripheral winding section and a second spiral-shaped winding comprises a second peripheral winding section, wherein the first spiral-shaped winding and the second spiral-shaped winding are adjacent and wherein the first peripheral winding section and the second peripheral winding section are adjacent, and wherein when current flow occurs, the direction of current is at least approximately in the same direction in the first peripheral winding section and the second peripheral winding section.

15. Tool apparatus in accordance with claim 12, wherein, when a current flows in adjacent peripheral winding sections of adjacent spiral-shaped windings, the direction of current is at least approximately in the same direction in both a row and a column.

16. Tool apparatus in accordance with claim 12, wherein a sense of rotation of an electrical current is in the same sense within a spiral-shaped winding, and the senses of rotation are in opposite senses in adjacent spiral-shaped windings.

17. Tool apparatus in accordance with claim 1, wherein the coil apparatus comprises at least one flat coil.

18. Tool apparatus in accordance with claim 1, wherein the coil apparatus is formed by at least one high-frequency Litz wire.

19. Tool apparatus in accordance with claim 18, wherein the at least one high-frequency Litz wire is held to a carrier via one or more holding threads.

20. Method for producing a component part from a composite material by way of a forming tool, said method comprising:
- placing a workpiece in contact against a contact region of the forming tool; and
- non-contact heating at least a portion of the contact region of the forming tool by an inductive heating mat;
- wherein the workpiece is positioned between the contact region and the heating mat;
- wherein the inductive heating mat is a mat that comprises a coil apparatus; and
- wherein the inductive heating mat is flexurally flexible.

21. Method in accordance with claim 20, wherein at least one of the following conditions is satisfied:
- the heating mat itself is heated by ohmic heat and heats the workpiece via ohmic heat;
- a susceptor is positioned between the heating mat and the workpiece, which susceptor is permeable to electromagnetic fields of the heating mat such that the forming tool is inductively heated by the heating mat, and wherein the susceptor is inductively heated by the heating mat;
- the heating mat is adapted or is adaptable to a shape of a workpiece.

* * * * *